Sept. 14, 1926.
J. C. BARRY
1,600,033
SELF PROPELLED VEHICLE
Filed Nov. 4, 1924
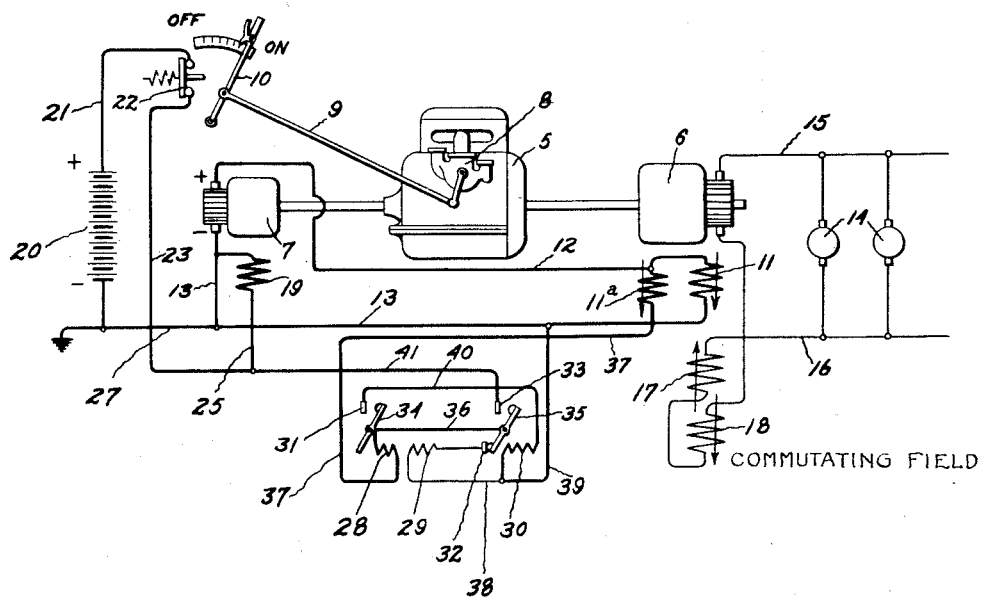
Inventor:
John C. Barry,
by Alexander S. [signature]
His Attorney.

Patented Sept. 14, 1926.

1,600,033

UNITED STATES PATENT OFFICE.

JOHN C. BARRY, OF ERIE, PENNSYLVANIA, ASSIGNOR TO GENERAL ELECTRIC COMPANY, A CORPORATION OF NEW YORK.

SELF-PROPELLED VEHICLE.

Application filed November 4, 1924. Serial No. 747,848.

The present invention relates to self-propelled vehicles of the type embodying an engine, generator, battery combination and is well adapted for use in systems wherein an internal combustion engine drives a generator which in turn supplies current to electric motors connected to axles of the vehicle, and wherein a separate exciter is provided for the field of the generator and a storage battery is provided for the exciter for energizing its field when starting, the battery being charged by the exciter, although it is not necessarily limited thereto. In such systems the exciter voltage is higher than that required for charging the battery making it necessary to insert a resistance in the battery-charging circuit and the object of my invention is to provide an improved arrangement wherein while I provide the necessary charging resistance, I avoid the losses incident to the usual charging resistance.

According to my invention I utilize the resistance for the battery-charging circuit as a part of the field winding of the generator or reversely expressed, I utilize a part of the generator field winding as a resistance through which the battery is charged by the exciter. By this means it will be seen that I make use of the drop across the battery-charging resistance for energizing in part the field winding of the generator thereby avoiding the loss incident to the use of an ordinary charging resistance.

In the drawing, the figure is a diagrammatic view of a system embodying my invention.

Referring to the drawing, 5 indicates an internal combustion engine such as a gas engine or an oil engine to which is directly connected a direct current generator 6 and an exciter 7. The controlling means for the engine, here indicated as being in the form of a throttle valve 8, is connected by a link 9 to an operating handle 10. Generator 6 is provided with a main field winding 11 which is connected directly to the terminals of exciter 7 by conductors 12 and 13, conductor 12 leading to the positive terminal of the exciter and conductor 13 to the negative terminal thereof. Generator 6 is provided also with an additional field winding 11ª which serves as a battery-charging resistance. At 14 is indicated the load on the generator which load is in the form of motors for driving the car or vehicle. Motors 14 are connected to generator 6 by conductors 15 and 16 and in this circuit is a differential series field winding 17 which opposes field winding 11. Also in this circuit is a cumulative series commutating field winding 18 such as is usually provided in connection with generators of this type.

Exciter 7 has a field winding 19 which is connected in series with a storage battery 20 by way of conductors 21, switch 22, conductor 23, conductor 25, and conductors 13 and 27. Switch 22 may be of any suitable type, a snap switch biased to a closed position being employed preferably, and the arrangement is such that when control handle 10 is in "off" or idling position, it engages switch 22 to open it and that when control handle 10 is moved away from "off" or idling position it releases the switch and permits it to close automatically.

Exciter 7 is connected to battery 20 to charge it by a charging circuit including a suitable reverse current relay which relay includes a holding magnet 28, operating magnets 29 and 30, contacts 31, 32 and 33 and contact levers 34 and 35 which are electrically connected together by a conductor 36. The exciter is connected to operating magnet 29 by an operating circuit which may be traced from the positive terminal of the exciter through conductor 12, generator field winding 11ª, a conductor 37, holding magnet 28, conductor 36, contact lever 35, contact 32, operating magnet 29, and conductors 38 and 39, to conductor 13 and thence by way of conductor 13 to the negative terminal of the exciter. Whenever the potential of exciter 7 reaches a value a predetermined amount higher than that of the battery, then the arrangement is such that operating magnet 29 will move contact lever 34 into engagement with contact 31 thus closing a circuit through operating magnet 30 from the positive side of exciter 7 through conductor 12, generator field winding 11ª, conductor 37, holding magnet 28, control lever 34, contact 31, a conductor 40, operating magnet 30 and conductors 39, and 13 to the negative terminal of exciter 7. Operating magnet 30 then moves lever 35 away from contact 32 thus opening the operating circuit through magnet 29, and into engagement with contact 33 closing a battery-charging circuit from the positive terminal of exciter 7 through conductor 12, field winding 11ª, conductor 37, holding magnet 28, conductor 36, contact arm 35, contact 33, a conductor 41, conductor 23, switch 22, conductor 21, battery 20, and conductors 27 and 13 to the negative terminal of the exciter. As will be noted, generator field winding 11ª is in this battery-charging circuit and serves as the battery-charging resistance. The arrangement is such that as long as the potential of the exciter is higher than that of the battery 20, holding magnet 28 will remain energized to maintain the charging circuit closed. When the exciter voltage falls below the battery voltage, however, then magnet 28 permits contact arm 34 to move to effect the opening of the battery-charging circuit.

In any event, when operating handle 10 is moved to "off" or idling position, switch 22 is operated to open the battery-charging circuit.

When operating handle 10 is in "off" or idling position switch 22 is held open so that battery 20 is disconnected from exciter field 19. As a result no power is generated by either the exciter 7 or the generator 6. Now as soon as control handle 10 is moved toward "on" position, switch 22 closes immediately connecting battery 20 to exciter field 19. The voltage generated by exciter 7 thus increases rapidly and supplies current to the field 11 of generator 6 causing it to quickly build up voltage and supply energy to motors 14. The current supplied by generator 6 to motors 14, flows through differential series field 17 which is opposed to the field windings 11 and 11ª so that the effective field of generator 6 is the resultant of the opposed fields 11, 11ª and 17, and it will be clear that as the current flowing in the load circuit increases, the field of generator 6 is weakened thus decreasing the voltage and thereby tending to maintain constant load on the generator. This differential field control arrangement for maintaining constant load on the generator forms no part of my present invention, such systems being disclosed and claimed in the application of Hermann Lemp, Serial No. 720,713, filed June 17, 1924. The magnetic relation between the various field windings of the generator is indicated by suitably placed arrows.

As soon as the exciter voltage reaches a value sufficiently high for charging the battery, the battery-charging circuit is closed as already explained, and is maintained closed as long as this voltage value is maintained. In the battery-charging circuit is the generator field winding 11ª which serves both as a battery-charging resistance and also as a means for exciting the field of the generator.

It is to be understood that I have illustrated my invention in connection with the differential field control arrangement shown only by way of example and because it is an arrangement in connection with which my invention may be utilized with advantage, and it is to be understood that my invention may be used in connection with any system to which it may be found applicable.

What I claim as new and desire to secure by Letters Patent of the United States, is,—

1. In combination, an exciter, a generator, an electric battery, a charging circuit for the battery connected with the exciter, and a resistance for the battery-charging circuit which resistance serves also as a field winding for the generator.

2. In combination, an exciter, a generator having a main field winding and a second field winding, an electric battery, and a charging circuit for the battery, said charging circuit including the second field winding and the exciter.

3. An electric system comprising a generator, an exciter for the generator, a battery and a charging circuit for the battery connected with the exciter, characterized by the fact that a part of the generator field winding is utilized as a resistance for the battery-charging circuit.

4. In combination, an engine, a generator driven by the engine, an exciter for the generator which exciter is also driven by the engine, a storage battery for exciting the field of the exciter, a charging circuit which connects the battery to the exciter, and a resistance in the charging circuit which resistance serves also as a field winding for the generator.

5. In combination, an electric storage battery, an exciter having a field winding connected with the battery to be energized thereby, a generator having a field winding connected with the exciter to be energized thereby, a second field winding for the generator, a battery-charging circuit connecting the exciter with the battery, said second field winding being included in said circuit, and a relay responsive to the voltage of the exciter connected with said battery-charging circuit to control the same.

6. In combination, an electric storage battery, an exciter having a field winding connected with the battery to be energized thereby, a generator having a field winding connected with the exciter to be energized thereby, an engine by which the exciter and generator are driven, a control means for the engine, which means is movable to an idling position, a battery-charging circuit connecting the exciter with the battery, a second field winding for the generator connected into said circuit, a normally closed switch in said circuit adjacent the battery, said switch being connected with and opened by the engine control means when the latter is moved to the idling position, and a relay means in said battery-charging circuit responsive to the voltage of the exciter.

In witness whereof, I have hereunto set my hand this first day of November, 1924.

JOHN C. BARRY.